United States Patent [19]
Brosman

[11] Patent Number: 5,280,801
[45] Date of Patent: Jan. 25, 1994

[54] CAR-BORNE TENT

[75] Inventor: Fryderyk Brosman, 135 Wilton Bank, Saltburn by Sea, Cleveland TS12 1NS, England

[73] Assignees: Mary Phyllis Hamnett; Fryderyk Brosman, Saltburn-by Sea, England

[21] Appl. No.: 70,508

[22] Filed: Jun. 1, 1993

Related U.S. Application Data

[63] Continuation of Ser. No. 774,419, Oct. 10, 1991, abandoned.

[51] Int. Cl.⁵ .................................. E04H 15/06
[52] U.S. Cl. ............................ 135/88; 135/108; 135/112; 135/111; 296/161
[58] Field of Search ............. 135/88, 89, 108, 112, 135/111; 296/161, 159

[56] References Cited

U.S. PATENT DOCUMENTS

| | | | |
|---|---|---|---|
| 1,456,918 | 5/1923 | Dudley | 135/112 |
| 3,254,657 | 6/1966 | Reger | 135/88 |
| 3,431,922 | 3/1969 | Kilbride | 135/88 |
| 3,596,977 | 8/1971 | Bunger | 135/88 |
| 3,608,953 | 9/1971 | Bernard | 52/66 |
| 3,845,775 | 11/1974 | Norris | 135/88 |
| 3,861,572 | 1/1975 | Norris et al. | 224/42.1 E |
| 3,941,414 | 3/1976 | Platt | 52/66 |
| 4,294,486 | 10/1981 | Espejo | 135/88 |

FOREIGN PATENT DOCUMENTS

| | | | |
|---|---|---|---|
| 731966 | 4/1966 | Canada | 135/88 |
| 1137837 | 10/1962 | Fed. Rep. of Germany | 135/88 |
| 1030198 | 3/1966 | United Kingdom | E04H 11/20 |
| 1391685 | 4/1975 | United Kingdom | A45F 1/00 |
| 1502473 | 3/1978 | United Kingdom | 296/159 |
| 2097031 | 10/1982 | United Kingdom | B60R 9/04 |

Primary Examiner—Henry E. Raduazo
Attorney, Agent, or Firm—Kenneth A. Keeling

[57] ABSTRACT

A tent frame comprising a frame-carrying base; means for mounting the base, in use, on a mobile platform such as the roof of a vehicle; an elongate frame member constituting the ridge frame member of the ultimately-assembled tent frame; and respective arms and legs each mounted or adapted for mounting upon the ridge frame member in such a way that the arms can extend from the ridge frame member outwardly, and the legs can extend from the arms generally downwardly, to form the side frame members of the ultimately-assembled tent frame; characterized by the features that the ridge frame member, the base, and some at least of the frame's arms and legs, are packaged in such a way that when the package is mounted on the mobile platform and conveyed to an intended site of use, (a) sufficient of the frame can be assembled for the frame to be self-supported on the surface on which the vehicle rests; (b) the thus-far-assembled frame is then readily separable from the platform; and (c) the frame side members do not then prevent the vehicle from moving out from under the frame and being driven away.

Preferably the ridge member can be raised relative to the base, before the vehicle is driven away, by a parallelogram linkage incorporating an "over-center" spring mechanism to assist the operation of the linkage in both the raising and lowering directions.

17 Claims, 5 Drawing Sheets

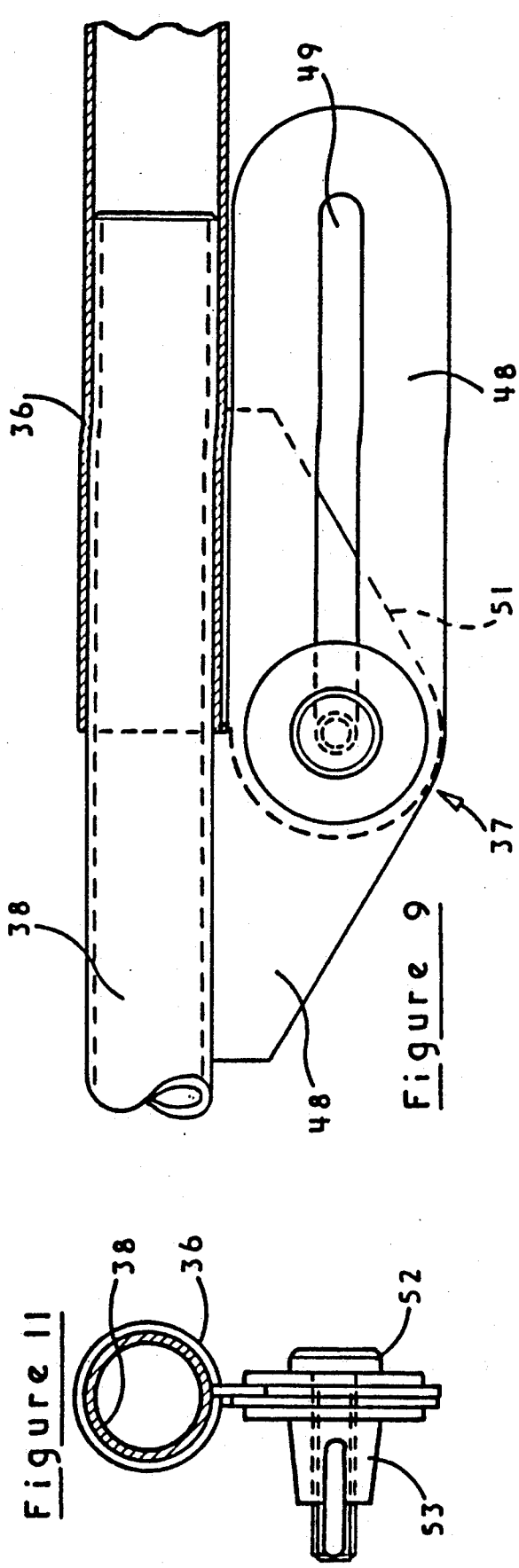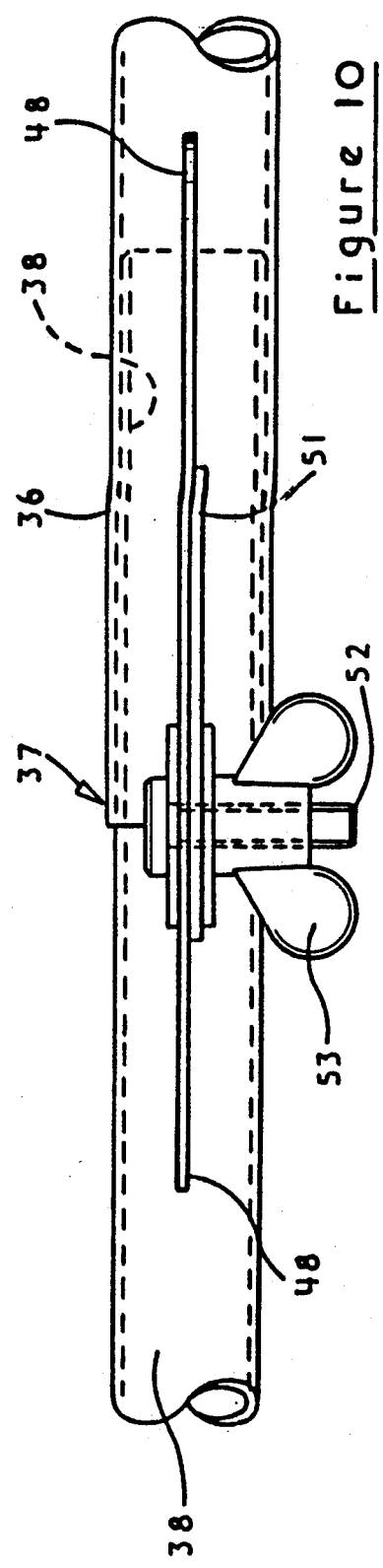

CAR-BORNE TENT

This is a continuation of copending application Ser. No. 07/774,419 filed on Oct. 10, 1991 and now abandoned.

BACKGROUND TO THE INVENTION

The invention relates to tent frames and tents, and one of its objects is to provide a tent which can be carried on the roof of a car or other vehicle at which is easier and more convenient to erect than conventional tents.

SUMMARY OF THE INVENTION

A tent frame comprising a frame-carrying base; means for mounting the base, in use, on a mobile platform such as the roof of a vehicle; and elongate frame member constituting the ridge frame member of the ultimately-assembled tent frame; and respective arms and legs each mounted or adapted for mounting upon the ridge frame member in such a way that the arms can extend from the ridge frame member outwardly, and the legs can extend from the arms generally downwardly, to form the side frame members of the ultimately-assembled tent frame; characterised by the features that the ridge frame member, the base, and some at least of the frame's arms and legs, are packaged in such a way that when the package is mounted on the mobile platform and conveyed to an intended site of use, (a) sufficient of the frame can be assembled for the frame to be self-supported on the surface on which the vehicle rests; (b) the thus-far-assembled frame is then readily separable from the platform; and (c) the frame side members do not then prevent the vehicle from moving out from under the frame and being driven away.

Other features of the invention which are believed to be new and to involve an inventive step, and which will be illustrated by way of example only in the following description with reference to the accompanying drawings, are defined in the claims.

BRIEF DESCRIPTION OF THE DRAWINGS

In the accompanying drawings:

FIGS. 9, 10 and 11 drawn to an enlarged scale, show the special hinge-mount joining the side frame members of this second embodiment to the ridge member.

DESCRIPTION OF THE PREFERRED EMBODIMENTS

Figure 1:
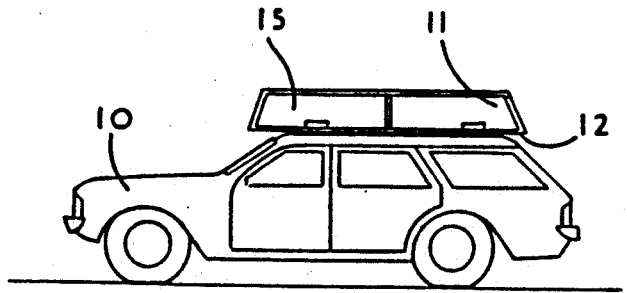
FIG. 1 is an elevation of a car to which a first form of tent frame has been fitted, the frame being shown in the collapsed condition in which it is transported.
Figure 2:
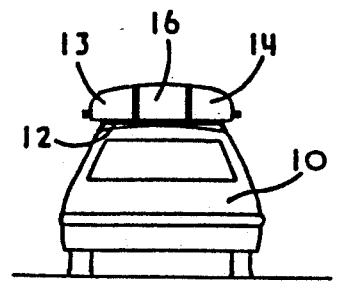
FIG. 2 is a view from the rear of the car and tent frame of FIG. 1.

The car 10 illustrated in FIGS. 1 to 7 carries a package 11 upon its roof, to which the package is secured by conventional clamping attachments (not illustrated) resembling those of a roof rack. The package includes a base 12, which carries side panniers 13, 14, the contents of which are accessible via doors 15. Between the panniers are the frame parts and tent cover from which a tent will be assembled, protected during transit by means of a weatherproof soft cover 16.

An elongate frame member 17 is linked to the base 12 by lifting arms 18, pivoted at their ends to the frame member and the base respectively to form a double-sided parallelogram linkage by which the member 17 may be lifted into positions above the base by pivoting of the arms 18.

Figure 3:
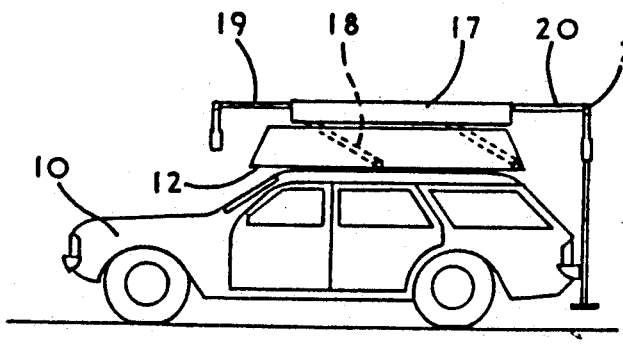
FIGS. 3 and 4 are views corresponding to FIGS. 1 and 2 but with the tent frame in a partly-erected condition.
Figure 4:
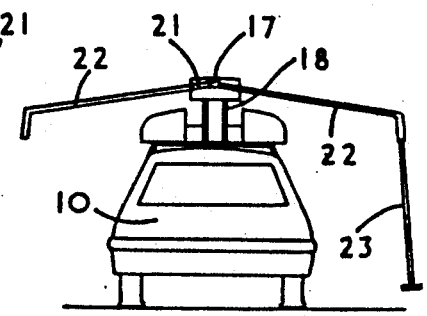

When the car arrives at the camping site, the arms 18 are pivoted sufficiently only for the frame member 17 to be lifted above the level of the panniers 13, 14 as illustrated in FIG. 3. Lifting may be assisted by springs or jacks, preferably by springs of the "over-centre" kind. The member 17 has telescopic extensions 19, 20 by means of which it may be extended forwardly and rearwardly respectively and at the outer ends of these extensions are provided short cross-pieces 21, each having sockets at both ends. Arms 22 are fitted into these sockets and extend laterally outwardly for example, at an angle of the order of from 5 to 15 degrees below the horizontal and somewhat downwardly (ditto, to the vertical) as illustrated. Into further sockets in the free ends of the arms 22, support legs 23 are fitted. The legs 23 are telescopically extensible but at this stage remain retracted.

Figure 5:
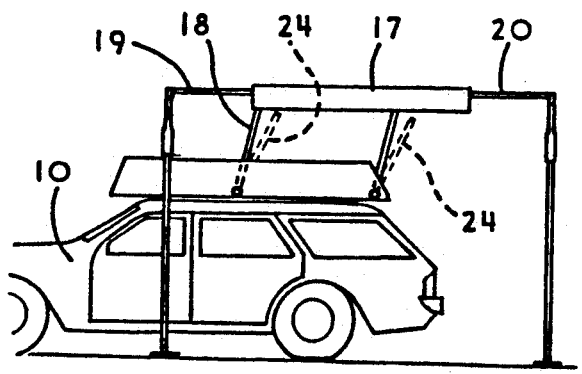
FIGS. 5 and 6 are further views corresponding to FIGS. 1 and 2 but with the tent frame fully erected.
Figure 6:
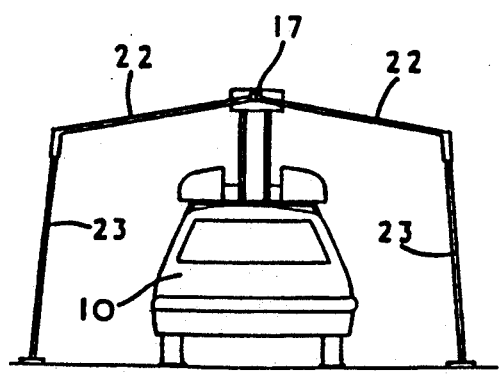
Figure 7:
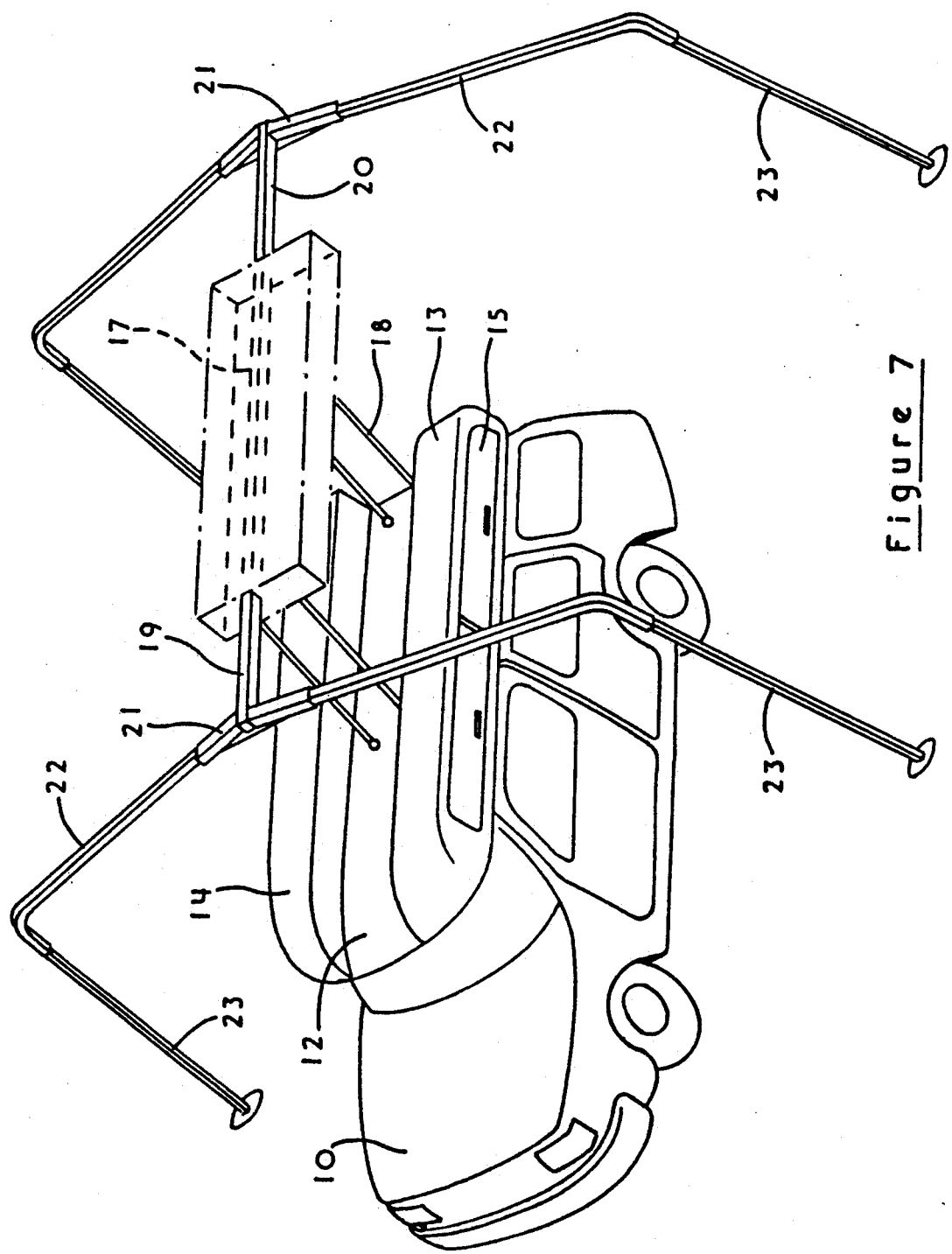
FIG. 7 is a perspective view, to a larger scale, of the car and tent frame in the condition illustrated in FIGS. 5 and 6.

The member 17 is now raised to a higher level (FIG. 5) by further pivoting of the lifting arms 18 (clockwise as illustrated). From this position, the support legs 23 are now extended downwardly until they engage the ground as shown in FIGS. 5 and 6. Further pivoting of the arms 18 to the position indicated by the reference numeral 24 in FIG. 5 disengages the arms 18 from the member 17 and allows the car 10 to be driven out from under the now fully-erected tent frame. The arms can be swung back down into the space between the panniers 13 and 14 until they are eventually required when the tent is to be stowed again.

A tent cover (not shown) of a size appropriate to the erected frame is carried upon the member 17 and may now be unfolded into place over the frame, before being secured in place both to the frame and also conventionally to the ground.

The tent cover, although not illustrated, is preferably "tunnelled" around the ridge member 17 and its extensions 19 and 20. That is to say, part of the cover material is formed into an elongate tube which embraces these members 17, 19 and 20. In a preferred construction, the tunnel is split so that it can be folded around the ridge member; and the then-overlapped folded-together opposite edges of the tunnel are secured to one another releaseably by VELCRO touch-and-close fasteners or similarly readily releaseable but sufficiently normally secure fastening means (the word VELCRO is a trade mark).

Figure 8:
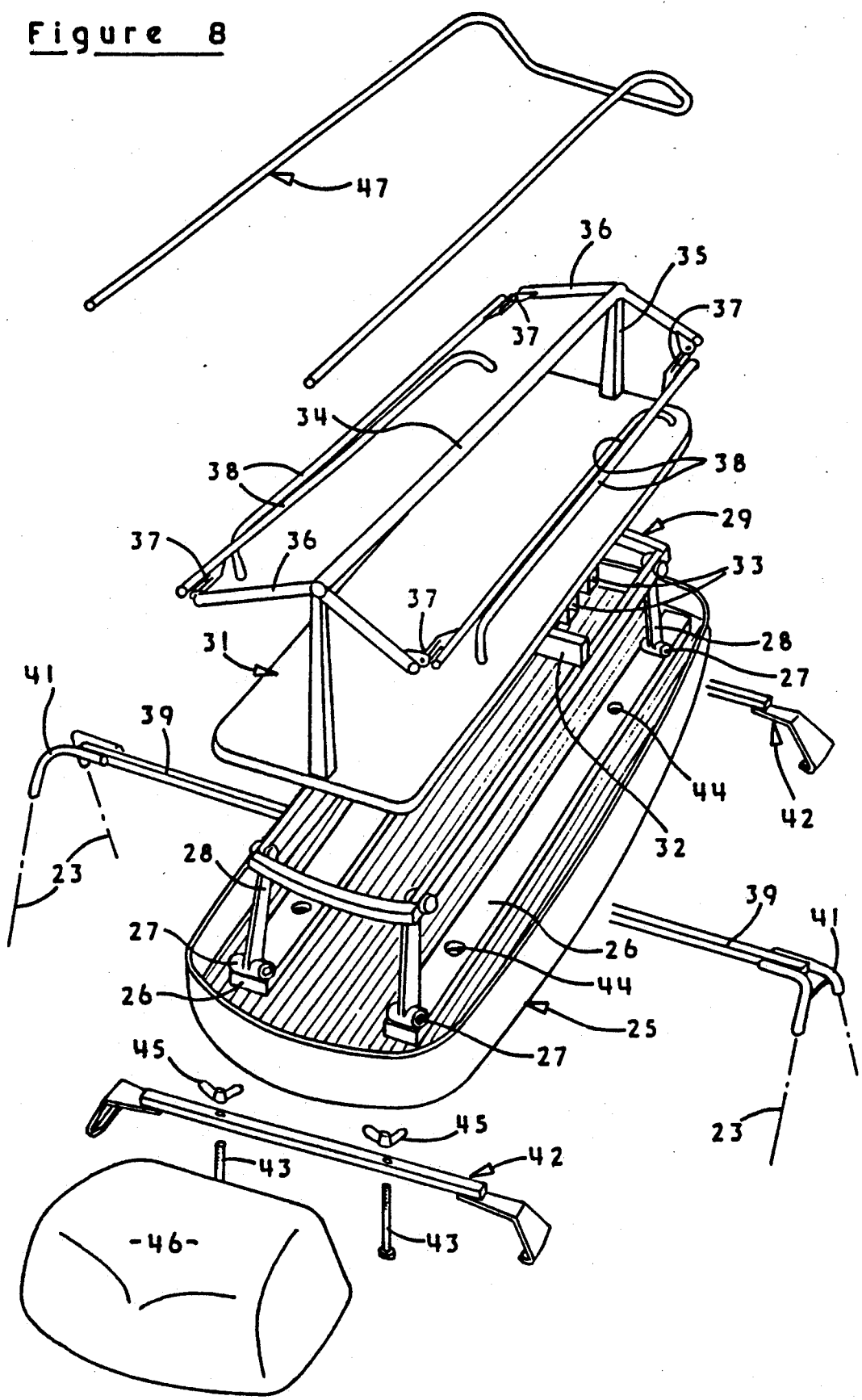
FIG. 8 shows a second form of tent frame, embodying the invention, in "exploded" perspective.

Referring now to FIG. 8, a more developed form of the invention is shown which works in essentially the same basic way as the embodiment of FIGS. 1 to 7 but which has a number of further advantageous features.

The base 25 of this embodiment is a moulded elongate plastics tray with shallow side walls and a ribbed bottom surface. It houses a rigid rectangular steel framework whose opposite longitudinal side members 26 run in the valleys between adjacent ribs of the moulded tray, hence helping to brace the tray, and also act as supports for the housings of pivots 27 from which the respective arms 28 of a parallelogram linkage rise.

The length of the tray 25 is such that, with the linkage arms 28 folded flat into it, the linkage is accommodated below the walls of the tray. Also accommodated within the tray, in this condition of the linkage, is a rigid rectangular steel frame 29 to which the other ends of the linkage arms 28 are pivotally attached.

The pivots 27 each incorporate spring means, of a kind which is known in itself from other fields, and which act torsionally to give an "over-centre" action to the linkage. That is to say, when the linkage is raised from its folded-flat in-tray condition just outlined, the spring means will assist the unfolding of the linkage towards a position in which the arms 28 rise approximately vertically from the side members 26; and the spring means will similarly initially assist the first part of the subsequent folding-flat movement of the linkage from that position.

These spring means are not specifically illustrated, nor need they be described. The intended skilled addressee of this specification can supply them from the known art. But it is believed to be both new and to involve an inventive step to think of using them in a mobile tent frame.

The framework 29, like the framework 26, is an open one. When the parallelogram linkage is folded flat into the tray, the two frameworks may overly one another or they may—in order to save vertical space—be so constructed that one of them lies within the other. The details are unimportant to the invention. But in either event, a shelf 31 sits on top of the framework 29 and is located—but not secured—in position on the framework 29 by virtue of the inter-fit between a bar 32 (which spans the framework 29 approximately midway along its length) and two spaced-apart bars 33 which span the underside of the shelf 31, and are parallel one with another, again approximately mid-way along the length of the shelf.

The bar 32 and the bars 33 are each square-section bars. The spacing between bars 33 accommodates bar 32 relatively easily. Shelf 31 is so sized that it overlaps framework 29 peripherally.

An elongate ridge frame member 34 is supported on opposite-end struts 35 above shelf 31. Respective end frames 36 extend from each opposite end of ridge member 34 as shown. A hinge-mount 37 is fixed to each opposite extremity of each end-frame 36 so that there are four such hinge-mounts spaced one above each corner of shelf 31.

These hinge-mounts each carry a respective arm 38. The construction of the mounts, which are shown in detail in FIGS. 9, 10 and 11, enable arms 38 to lie approximately horizontally and parallel to ridge member 34 as illustrated in FIG. 8; whilst being able to be swung out, first, to a position in which they are in line with their corresponding end-frame 36 and, then, telescoped into or over the tubular end-frame members to define an arm extending approximately at right angles from ridge member 34.

Before arms 38 can be moved into this just-described projecting position, however, linkage 28 has to be operated and before this operation is described, the description of the rest of the package illustrated in FIG. 8 will be completed.

Each of the bars 33 which span the underside of shelf 31 is an open-ended square-section tube. A similarly-sectioned pair of arms 39 is carried, normally, in tray 25. In use, each of these arms 35 plugs into a respective opposite end of one of the bars 33—it does not matter which bar as long as, for preference, the two arms 39 are each plugged into the same bar—to project from the elongate axis of shelf 31 (and hence from ridge member 34) at right angles and in approximately the same generally downward manner as the then-projecting arms 38.

Fixed to the thus-projecting ends of arms 39 are respective splay-fittings 41. Elongate legs, identical in function to the legs 23 of the previous embodiment illustrated in FIGS. 1 to 7, can fit into each of these splay-fittings 41. Similar legs can fit into the by-then-projecting and downward-turned extremities of arms 38 to form, with the arms 38 and 39, the side members of the tent frame.

Conventional roof rack bars 42 span the underside of tray 25 and are appropriately spaced one from another along the length of the tray. Bolts 33 pass through the cross-bars of the units 42 and through holes 44 in the in-tray side frame members 26 to be secured to the members 26 by readily releasable wing nuts 45. This arrangement not only enables the roof rack units 42 to be separated from the rest of the tent frame package when required; if the roof rack cross-bars are wide enough, and the tray 25 slim enough, the rack could be used as a conventional roof rack to carry luggage as well as mounting the tray 25 and its associated components.

A semi-rigid nose cone 46 of moulded plastics material snap-fits releasably into the suitably-lipped front-facing end of the tray 25. A resilient spring steel rail section 47 clips one end into the top of the cone 46 and at its other end into the rearward-facing end of tray 25. The illustrated opposite-side rails of this component 47 allow a flexible cover (not shown) to be fitted into place and to shroud the whole unit in a weatherproof manner.

A tent cover (not shown) is fitted around ridge member 34 in the manner previously described with reference to the first embodiment of FIGS. 1 to 7. The remainder of the cover can be furled to lie within the tray and the components that it houses when the thus-defined package is being transported.

The way the package of FIG. 8 is used will by now be apparent. When nose cone 46, rail 47, and the weatherproof cover surrounding them have been removed, linkage 28 is swung to raise shelf 31 and hence ridge member 34 to a position in which it is held above tray 25. Arms 38 are then pivoted out and locked into their projecting positions. Arms 39 are plugged into place. Legs 23—eight of them in all—are plugged into position. Linkage 28 can be swung flat again, bars 33 having been raised slightly above bar 32 by the assembly into place of legs 23. And the vehicle to which tray 25 is secured can then be driven away to leave the tent cover free to unfurl and be secured to the frame side members and conventionally to the ground.

Instead of swinging arms 38 out in the operation just described, arms 39 alone could be plugged into place and legs 23 inserted into splay-fittings 41. This gives the vehicle maximum room for manoeuvre as it is driven away and, subsequently, as it is driven back into position under shelf 31.

Shelf 31 functions, literally, as a below-eaves storage shelf when the tent is actually in use. Equally if not more importantly, it enables the car to have to locate only approximately under the ridge when it is driven into stow the tent frame after use. Although two bars 33 have been illustrated, in this latter context only one is strictly necessary and this would make it even easier to locate the car roof underneath shelf 31 when the time came to re-package the tent frame.

Figure 14:
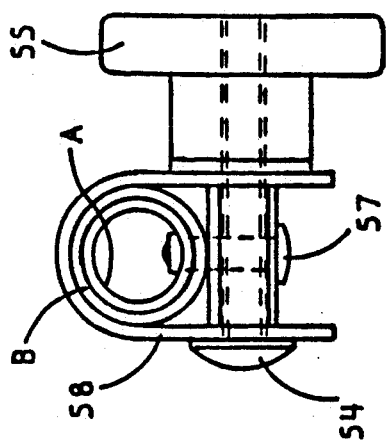
FIGS. 12, 13 and 14 are views corresponding respectively to FIGS. 9, 10 and 11 in viewing angle but showing a special form of clamp acting on the telescoping parts of certain of the frame members of this second embodiment.
Figure 12:
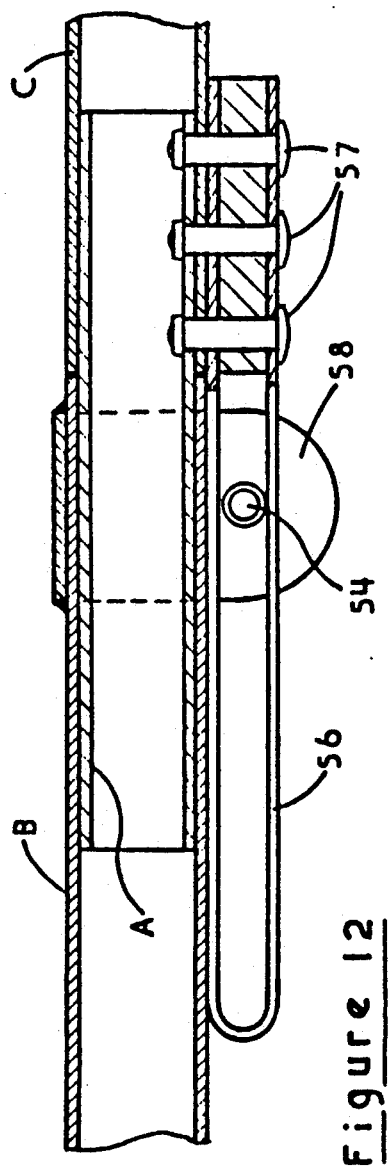
Figure 13:
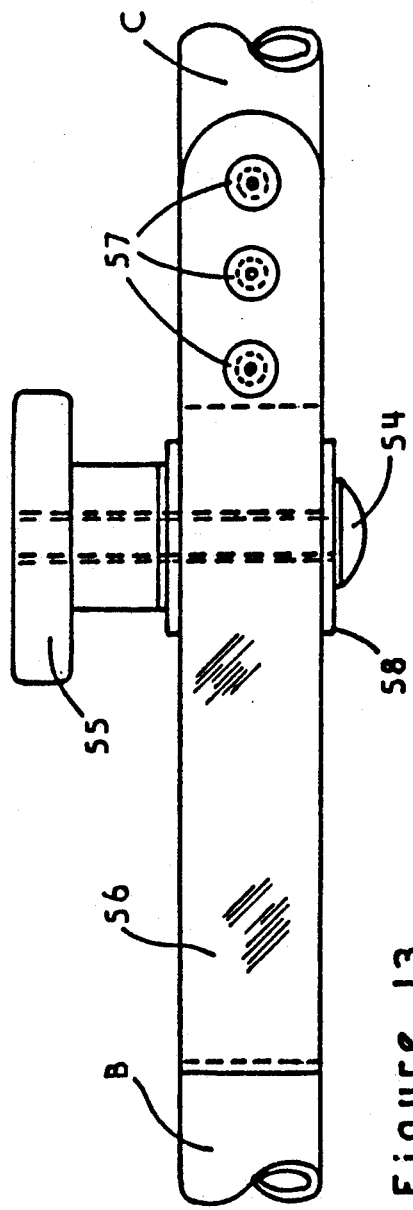

FIGS. 9, 10 and 11 (the hinge-mounts 37) and FIGS. 12, 13 and 14 (the telescope-locking means) are self-explanatory in view of the foregoing description and the accompanying drawings. But each of them is believed to be both new and to involve an inventive step in its own right as well as when applied to a tent frame or tent embodying the present invention. They will therefore be described in rather more detail.

Each hinge-mount 37 comprises a flat elongate plate 48 fixed to one of the elongate arms 38. A slot 49 is formed in this plate. When the plate is fixed to the arm, the plate projects radially from the axis of the arm 38, and the slot 49 runs parallel with the arm axis.

Another similarly flat plate 51 is fixed to the open end region of the outwardly and downwardly projecting end-frame tube 36 (of which there are two such tubes in each end-frame assembly). This plate 51 is drilled to take a headed bolt 52. The bolt 52 is an easy sliding fit in the slot 49 of plate 48. A wing nut 53 screws onto the bolt 52 and FIGS. 9, 10 and 11 show how these various components are assembled to form the hinge-mount 37.

As previously outlined, the mounts 37 enable arms 38 to occupy two distinct positions, a first position as illustrated in FIG. 8, and a second position as illustrated in FIGS. 9, 10 and 11. Slackening the wing nut 53 allows plate 48 to move, carrying with it arm 38, and enables arm 38 to be swung and slid from one of these positions into the other. Subsequent tightening of wing nut 53 holds the arm 38 in the selected position.

The telescope-locking means of FIGS. 12, 13 and 14 is similarly fastenable and unfastenable, this time via the co-operating action of a headed bolt 54 and a hand wheel clamp 55 which screw-threads onto the bolt. The two tubular arms which are arranged to be telescoped in this way are not referenced, since this telescoping feature could be applied to more than one of the arms of the illustrated embodiment. But the inner arm A of the telescoped arrangement has a U-shaped spring steel plate 56 secured to it by rivets 57 so as to run parallel with the axis of the arm A and to form a slideway for the bolt shank 54. A U-clamp plate 58 embraces and is fixed to the outer surface of the outer arm B of the telescope, and the hand wheel clamp 55 tightens the U-arm 58 via the bolt 54, or slackens it, to allow arms A and B to telescope relative to one another to an extent defined by the inside length of plate 56 (at one extreme) and the abutting contact between the end of tubular arm B and a similarly-tubular swaging sleeve C which is fixed to and embraces arm A.

Modifications may be made to the illustrated embodiment. The use of jacks, for example screw jacks, instead of springs has already been mentioned. The nose cone 46 could be permanently attached to the tray 25, with rails 47 swinging upwardly instead of coming away from the nose cone. Alternatively, a hard-cover version could be developed, and in either of these latter two cases, a relatively restricted arc of swing of the cover/rail (say no more than about forty-five degrees from the horizontal) might be enough.

It should also be stressed that to the best of the applicant's knowledge and belief, the use of a tent cover fixed permanently to the tent frame ridge member is both novel and inventive in the field of frame tents generally.

I claim:

1. A tent frame comprising:
   a frame-carrying base;
   mounting means for mounting the base on a mobile platform;
   an elongate frame member constituting a ridge frame member of the tent frame;
   said elongate frame member supported on said base by a frame supporting adjustment means which is detachable from said base;
   a plurality of outwardly-extending arms each arm attached to said elongated frame member;
   a plurality of downwardly-extending legs each leg removably attachable to an outwardly-extending arm;
   said frame supporting adjustment means comprising a parallelogram linkage for adjusting the elevation of the elongate frame member in relation to the base;
   said parallelogram linkage including linkage members rotatable about a horizontal axis, said linkage members generally horizontal in a first storage position and said linkage members generally vertical in a second extended position;
   whereby the tent frame may be assembled by rotating the said linkage members to said second extended position thereby elevating said elongated frame member; extending the outwardly-extendable arms; attaching said legs to said arms to support said tent frame on said legs, and removing said mobile platform and base from under the tent frame.

2. A tent frame according to claim 1 further comprising:
   spring means engaging said linkage members, said spring means including at least one spring having an over-center action in that beyond a certain point in the linkage member movement, the spring biases the linkage member toward said first storage position or toward said second extended position.

3. A tent frame according to claim 1 wherein:
   said mobile platform comprises the roof of a vehicle.

4. A tent frame according to claim 1 wherein the parallelogram linkage further comprises:
   a plurality of linkage members, each of the linkage members rotatably attached to the base at a first end and rotatably attached at a second distal end to a connection member, each connection member connecting at least two linkage member second ends;
   said elongated frame member supported on said connection members;
   whereby in a first storage position the linkage members and connection members lie in generally horizontal position adjacent the base, and in a second extended position, the linkage members extend generally vertically, and the connection members are generally parallel to the base and removed from the base.

5. A tent frame according to claim 1 wherein:
   each of said outwardly-extending arms is removably attached to said elongated frame member.

6. A tent frame according to claim 1 further comprising:

a shelf fixed below, and spaced from the elongate frame member whereby the shelf is suspended below the elongate frame member upon removal of the mobile platform.

7. A tent frame according to claim 1 further comprising:

mounting means for mounting the base on the mobile platform, said mounting means including clamps removably attached to the mobile platform and the base whereby the base may be removed for removable insertion of other alternative apparatus including a conventional roof rack.

8. A tent according to claim 1 wherein:

one or more of said arms includes a first hollow arm section and a second arm section;

said second arm section removably insertable in said first arm section;

connection means to rotatably connect said first arm section and said second arm section, said connection means comprising a first lateral extension to said first arm section a second lateral extension to said second arm section, and a bolt and nut;

said first lateral section containing an orifice;

said second lateral extension containing an elongated slot, said bolt inserted through said orifice and said slot;

whereby the second arm section may be inserted into the first arm section for lateral extension of the arm and removed from the first arm section and rotated about the axis of the bolt for storage.

9. A tent comprising:

a tent frame;

a frame-carrying base;

means for mounting the base on a mobile platform;

said tent frame including an elongate frame member constituting a ridge frame member of the tent frame;

said elongate frame member supported on said base by a frame supporting adjustment means which is detachable from said base;

said tent frame including a plurality of arms, said arms extending outwardly from said elongated frame member;

said tent frame including a plurality of legs, each leg extending downwardly from an arm;

a tent cover adapted to fit about the tent frame, the tent cover attached to the elongated frame member and foldable to rest on said base when not in use;

said frame supporting adjustment means comprising a parallelogram linkage for adjusting the elevation of the elongate frame member in relation to the base;

said parallelogram linkage including linkage members rotatable about a horizontal axis, said linkage members generally horizontal in a first storage position and said linkage members generally vertical in a second extended position;

wherein the tent may be assembled by rotating the said linkage members to said second extended position thereby elevating said elongated frame member; extending the arms outwardly; attaching said legs to said arms to support said tent frame on said legs; removing said mobile platform and base from under the tent frame, and arranging said tent over said tent frame.

10. A tent according to claim 9 further comprising:

spring means engaging said linkage members, said spring means including at least one spring having an over-center action in that beyond a certain point in the linkage member movement, the spring biases the linkage member toward said first storage position or toward said second extended position.

11. A tent according to claim 9 wherein said mobile platform comprises the roof of a vehicle.

12. A tent according to claim 9 wherein the parallelogram linkage further comprises:

a plurality of linkage members, each of the linkage members rotatably attached to the base at a first end and rotatably attached at a second distal end to a connection member, each connection member connecting at least two linkage member second ends;

said elongated frame member supported on said connection members;

whereby in a first storage position the linkage members and connection members lie in generally horizontal position adjacent the base; and in a second extended position, the linkage members extend generally vertically, and the connection members are generally parallel to the base and removed from the base.

13. A tent according to claim 9 wherein said arms are removably attachable to said elongated frame member.

14. A tent according to claim 9 wherein said legs are removably attachable to said arms.

15. A tent according to claim 9 further comprising:

a shelf fixed below, and spaced from the elongate frame member whereby the shelf is suspended below the elongate frame member upon removal of the mobile platform.

16. A tent according to claim 9 further comprising:

mounting means for mounting the base on the mobile platform, said mounting means including clamps removably attached to the mobile platform and the base whereby the base may be removed for removable insertion of other alternative apparatus including a conventional roof rack.

17. A tent according to claim 9 wherein:

one or more of said arms includes a first hollow arm section and a second arm section;

said second arm section removably insertable in said first arm section;

connection means to rotatably connect said first arm section and said second arm section, said connection means comprising a first lateral extension to said first arm section a second lateral extension to said second arm section, and a bolt and nut;

said first lateral section containing an orifice;

said second lateral extension containing an elongated slot, said bolt inserted through said orifice and said slot;

whereby the second arm section may be inserted into the first arm section for lateral extension of the arm and removed from the first arm section and rotated about the axis of the bolt for storage.

* * * * *